(12) United States Patent
Wihlborg et al.

(10) Patent No.: US 8,475,087 B2
(45) Date of Patent: Jul. 2, 2013

(54) TOOL FOR CHIP REMOVING MACHINING, AS WELL AS A BASIC BODY AND A CUTTING INSERT THEREFOR

(75) Inventors: Lennart Wihlborg, Ockelbo (SE); Sven-Olov Lindström, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 773 days.

(21) Appl. No.: 12/365,245

(22) Filed: Feb. 4, 2009

(65) Prior Publication Data
US 2009/0196701 A1   Aug. 6, 2009

(30) Foreign Application Priority Data
Feb. 5, 2008   (SE) ...................................... 0800265

(51) Int. Cl.
*B23C 5/08*   (2006.01)

(52) U.S. Cl.
USPC .............................................. 407/46; 407/67

(58) Field of Classification Search
USPC .................. 407/36, 37, 40, 41, 44, 46, 66, 67
See application file for complete search history.

(56) References Cited

U.S. PATENT DOCUMENTS

| | | | |
|---|---|---|---|
| 5,800,079 A * | 9/1998 | Qvarth ............................ | 407/46 |
| 5,810,518 A | 9/1998 | Wiman et al. | |
| 6,280,122 B1 * | 8/2001 | Qvarth ............................ | 407/36 |
| 7,086,812 B2 * | 8/2006 | Gamble et al. .................. | 407/46 |
| 7,118,311 B2 * | 10/2006 | Astrom ........................... | 407/46 |
| 7,156,588 B2 * | 1/2007 | Elbaz et al. .................... | 408/190 |
| 7,455,482 B2 * | 11/2008 | Lundvall ....................... | 407/113 |
| 7,549,358 B2 * | 6/2009 | Pantzar .......................... | 82/1.11 |
| 7,597,510 B2 * | 10/2009 | Lundvall ....................... | 407/113 |
| 2005/0135884 A1 | 6/2005 | Lundvall | |
| 2005/0158132 A1 | 7/2005 | Pantzar | |

FOREIGN PATENT DOCUMENTS

CN        1611316 A       5/2005

(Continued)

OTHER PUBLICATIONS

Chinese Office Action issued in a corresponding Chinese patent application on Oct. 10, 2011 (with English Translation).

(Continued)

*Primary Examiner* — Will Fridie, Jr.
(74) *Attorney, Agent, or Firm* — Morgan, Lewis & Bockius LLP

(57) ABSTRACT

A tool for chip removing machining, including a basic body, in which at least one seating is included, which is delimited by a base surface and a rear support protruding in relation to the base surface, the base surface including a first coupling section in the form of one or more ridges and grooves, and a replaceable cutting insert having an upperside, an underside and a clearance surface extending between the upperside and the underside and transforming into the upperside via at least one cutting edge, the underside including a second coupling section having one or more grooves and ridges which engage the grooves of the first coupling section, and vice versa, at the same time as a part of the clearance surface is urged against the rear support. An imaginary extension of the ridges of the first coupling section extends by the side of the rear support.

37 Claims, 5 Drawing Sheets

FOREIGN PATENT DOCUMENTS

| | | |
|---|---|---|
| EP | 1 524 051 A2 | 4/2005 |
| GB | 818262 A | 8/1959 |
| WO | 97/11806 A1 | 4/1997 |
| WO | 99/19105 | 4/1999 |
| WO | 99-19105 A1 | 4/1999 |
| WO | WO 99/19104 | 4/1999 |
| WO | 2004-033137 A1 | 4/2004 |
| WO | WO 2004/033137 A1 | 4/2004 |
| WO | WO 2005/080036 A1 | 9/2005 |

OTHER PUBLICATIONS

Notification of the Second Office Action by The State Intellectual Property Office of the People's Republic of China (SIPO)—Application No. 200980102787.x—Dated Jul. 11, 2012 Including English Translation.

EPO—European Search Report—European Patent Application No. 09708464.1—Issued on Jul. 16, 2012.

* cited by examiner

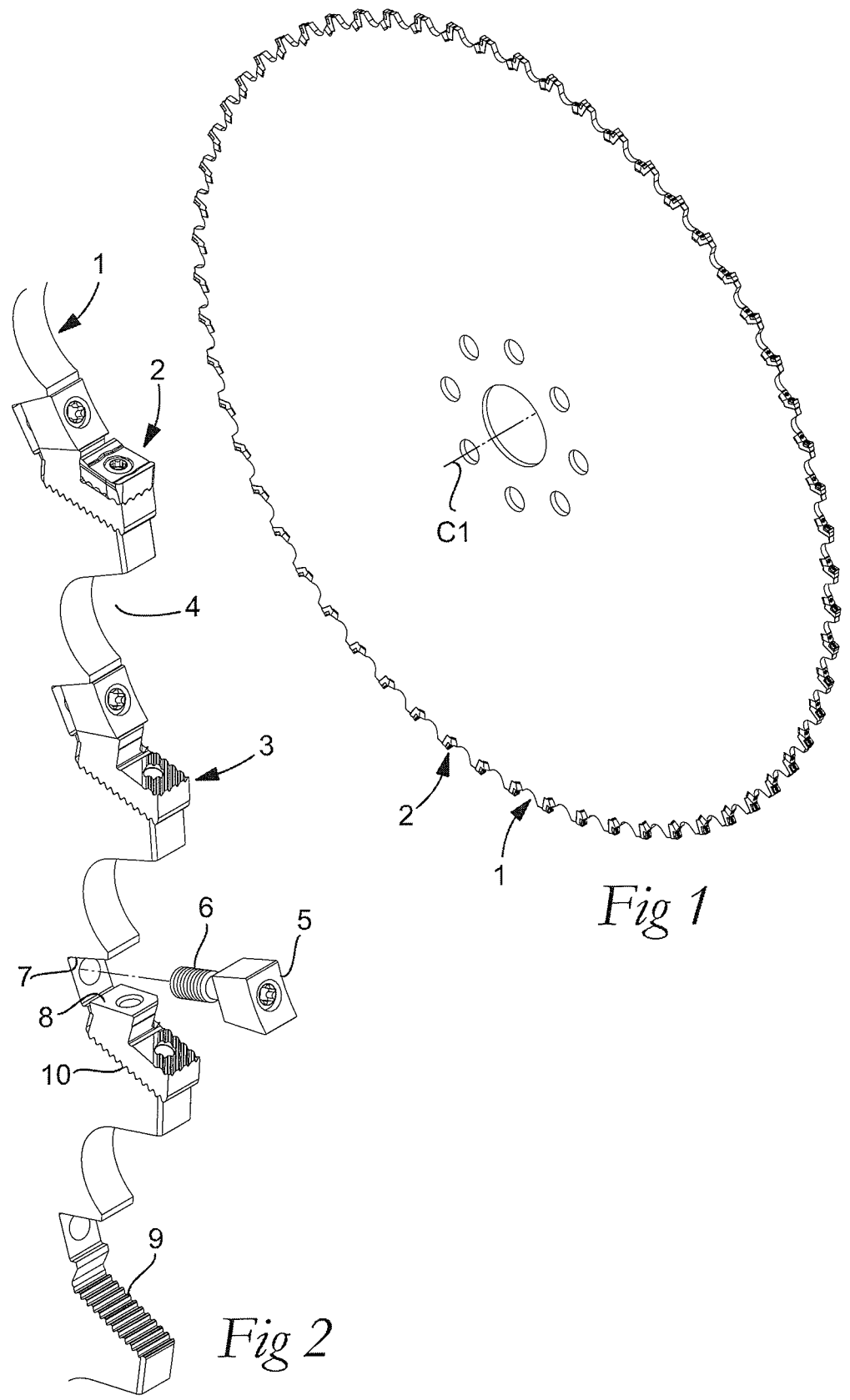

TOOL FOR CHIP REMOVING MACHINING, AS WELL AS A BASIC BODY AND A CUTTING INSERT THEREFOR

This application claims priority under 35 U.S.C. §119 to Swedish Patent Application No. 0800265-1, filed on Feb. 5, 2008, which is incorporated by reference herein in its entirety.

FIELD OF THE INVENTION

The present invention relates generally to a cutting tool or tool for chip removing machining of the type that includes, on one hand, a basic body, in which at least one seating is included, which is delimited by a base surface and a support protruding in relation to the same, the base surface including a first coupling section in the form of one or more ridges and grooves, and, on the other hand, a replaceable cutting insert having an upperside, an underside and a clearance surface extending between the same and transforming into the upperside via at least one cutting edge, the underside including a second coupling section having or one more grooves and ridges, the last-mentioned ones of which engage the grooves of the first coupling section, and vice versa, at the same time as a part of the clearance surface is pressed against the support. Tools of the kind in question are primarily for machining workpieces of metal. The invention also relates to a basic body for tools of the kind in question, as well as to a cutting insert particularly suitable for the tool.

BACKGROUND OF THE INVENTION

Although the invention is generally applicable to all types of cutting tools (e.g. milling, turning and drilling tools), the same has its origin in problems which are especially tied to milling cutters, in particular slitting cutters, having small cutting inserts.

In U.S. Pat. No. 5,800,079, a slitting cutter is disclosed, which in the traditional way includes a circular disc, the periphery of which is equipped with a plurality of replaceable cutting inserts of a hard and wear-resistant material, e.g., cemented carbide. These cutting inserts are mounted in separate cassettes of steel or the like, which are semi-permanently connected with the disc and placed in peripherally spaced-apart chip pockets, and can be exchanged individually if damage would occur, i.e., without the disc in its entirety needing to be discarded. In order to hold the individual cassette reliably anchored in the disc, as well as enable fine adjustment of the position of the cassette laterally, a wedge tightenable by a screw is used, by which a so-called serration surface (in the form of straight and parallel ridges and grooves) of the underside of the cassette can be forcefully pressed into a co-operating serration surface of the individual chip pocket of the disc. More precisely, the cross-sectionally wedge-shaped ridges of one of the serration surfaces is pressed into the grooves of the other serration surface, and vice versa, while providing a highly stable joint between the cassette and the disc, at the same time as the lateral position of the cassette, and thereby of the cutting insert, can be fine-adjusted in a simple way before the cassette is finally fixed by the wedge. The cutting insert is in turn mountable in a so-called insert seat or seating in the upperside of the cassette. In the tool that is shown in U.S. Pat. No. 5,800,079, the seating is delimited by a plane bottom surface or base surface, as well as two plane support surfaces, orientated perpendicularly to each other, viz. a rear support surface and a side support surface, against which surfaces the clearance surface of the cutting insert can be pressed by a compliant tightening screw, which simultaneously presses the underside of the cutting insert against the base surface of the seating. Later on, this tool was further developed so far that the base surface of the seating and the underside of the cutting insert were formed with coupling sections in the form of serration surfaces of the same type as of the joint between the underside of the cassette and the chip pocket of the disc, i.e., surfaces having mutually parallel ridges and grooves, which alternately engage each other. More precisely, the cutting insert was formed with a set of ridges, which extend parallel to two side clearance surfaces between front and rear ends, at least the front one of which includes the cutting edge requisite for the chip removal, while the base surface of the seating was formed with ridges, which extend in the plane of the disc (i.e., perpendicularly to the center axis of the disc), viz. from a front or outer end of the base surface toward the rear support surface. In such a way, the particular side support surface could be spared and the manufacture of the tool be facilitated.

The interface between the cutting insert and the cassette formed with two co-operating serration surfaces or coupling sections in the known side and face milling cutter works in a meritorious way as long as the cutting inserts are reasonably large, but if the cutting inserts have to be made with limited dimensions, problems occur so far that the ridges and the grooves of the coupling section of the cassette cannot be given sufficiently a great length to efficiently counteract rotation of the cutting insert and ensure a stable fixation of the same. Thus, the coupling section of the cassette is in practice manufactured by milling using a shank-end mill, by which a desired number of grooves are milled out in the initially plane base surface of the seating of the cassette. However, if the base surface of the seating is small in relation to the milling cutter, only short grooves and ridges can be provided. Supposing that the smallest shank-end mill, which can be used, has a diameter, which is as great as the length of the base surface, the length of the grooves and of the ridges is maximized to at most half of the diameter, because otherwise, the milling cutter would need to be fed forward so far that the same damages the protruding support surface.

The present invention aims at obviating the above-mentioned problems and at providing an improved tool for chip removing machining, in particular a side and face milling cutter. Therefore, an object of the invention is to provide a tool in which the seating or seatings, which has or have the purpose of receiving replaceable cutting inserts, can be formed with base surfaces, the coupling sections of which have an optimum projection area and the ridges a considerable length. In other words, it should be possible to form also small seatings for small cutting inserts with a base surface, which to the major extent is a coupling section of alternating ridges and grooves, wherein it should be possible to mill the grooves without damaging the protruding support surface of the seating, all for the purpose of ensuring a stable fixation of the cutting inserts and thereby a good machining precision.

Another object of the invention is to provide a tool, which is structurally simple and inexpensive to manufacture.

SUMMARY OF THE INVENTION

In an embodiment, the invention provides a tool for chip removing machining, including a basic body, in which at least one seating is included, which is delimited by a base surface and a rear support protruding in relation to the base surface, the base surface including a first coupling section in the form of one or more ridges and grooves, and a replaceable cutting insert having an upperside, an underside and a clearance surface extending between the upperside and the underside and transforming into the upperside via at least one cutting edge, the underside including a second coupling section having one or more grooves and ridges which engage the grooves of the first coupling section, and vice versa, at the same time as a part of the clearance surface is urged against the rear support. An imaginary extension of the ridges of the first coupling section extends by the side of the rear support.

In another embodiment, the invention provides a basic body of a tool for chip removing machining, including a seating that receives cutting inserts, which is delimited by a base surface and a rear support protruding in relation to the base surface, the base surface including a coupling section in the form of one or more ridges and grooves, wherein an imaginary extension of the ridges of the coupling section extends by the side of the rear support.

In yet another embodiment, the invention provides a replaceable cutting insert for a tool. The tool includes a basic body, in which at least one seating is included, which is delimited by a base surface and a rear support protruding in relation to the base surface, the base surface including a first coupling section in the form of one or more ridges and grooves, wherein an imaginary extension of the ridges of the first coupling section extends by the side of the rear support. The cutting insert includes an upperside, an underside, and a clearance surface extending between the upperside and underside and transforming into the upperside via at least one cutting edge, the underside including a second coupling section in the form of a plurality of ridges which are spaced-apart by grooves, each ridge having a pair of opposite ends, wherein the ridges run at an acute angle ($\gamma$) in relation to the cutting edge.

The invention is based on the idea of inclining an acute angle of the ridge and groove or ridges and grooves, which are included in the base surface of the seating that receives the cutting insert, so that imaginary extensions of the ridges are located by the side of the rear support surface of the seating. In such a way, e.g. a shank-end mill, can be brought past the support surface without coming into contact with the same, making it possible to form the greater part of the base surface with long, force-absorbing ridges.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

FIG. 1 is a perspective view of a tool made in accordance with an embodiment of the invention, which is exemplified in the form of a side and face milling cutter;

FIG. 2 is an enlarged, perspective detailed section showing how the disc-shaped basic body of the tool is equipped with cassettes and replaceable cutting inserts;

DETAILED DESCRIPTION OF THE PREFERRED EMBODIMENTS

Figure 3:
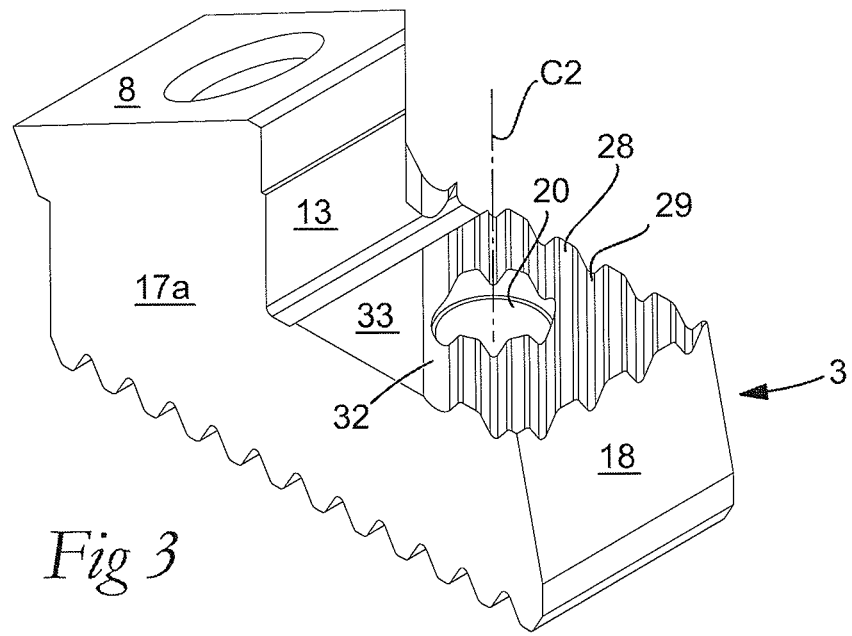
FIG. 3 is an enlarged top perspective view showing an individual cassette.

As an example of a tool to which the invention can be applied, a side and face milling cutter has been selected shown in FIGS. 1 and 2, which includes, on one hand, a basic body 1 in the form of a circular disc or blade, which is rotatable around a center axis C1, and, on the other hand, a large number of replaceable cutting inserts 2, which are mounted along the circumference of the disc. More precisely, the individual cutting insert 2 is mounted in a so-called cassette 3, which constitutes a part of the basic body by being semi-permanently connected thereto. Each such cassette 3 is placed adjacent to a chip pocket 4, opening in the periphery of the disc 1, and fixed by a wedge body 5, which, by a tightening screw 6, can be drawn in between, on one hand, a plane wedge surface 7 of the disc, and, on the other hand, a plane wedge surface 8 of the upperside of the cassette 3. In order to ensure a stable fixation of the cassette, an interface is used in the form of a so-called serration surface 9 of the disc body 1 and a co-operating serration surface 10 (see also FIGS. 4 and 6) of the underside of the cassette 3. The serration surfaces 9, 10 are in this case plane and include a plurality of straight and mutually parallel ridges, which are spaced-apart by grooves, the ridges of one of the serration surfaces engaging the grooves of the other one, and vice versa. The ridges are cross-sectionally wedge-shaped and formed so that they do not bottom in the appurtenant grooves. Furthermore, each individual ridge runs parallel to the center axis C1 of the disc body, and therefore forms a 90° angle with the plane of the disc. This means that the position of the cassette laterally in relation to the disc can be fine-adjusted in a simple way without the radial distance of the cutting insert from the center axis C1 being altered. Thus, the cassette can be displaced in relation to the serration surface 9 with the wedge body 5 loosely tightened, whereupon the last-mentioned one is finally tightened in order to fix the cassette immovably.

Reference is now made to FIGS. 3-6, which illustrate the nature of the cassette 3 in more detail.

Figure 4:
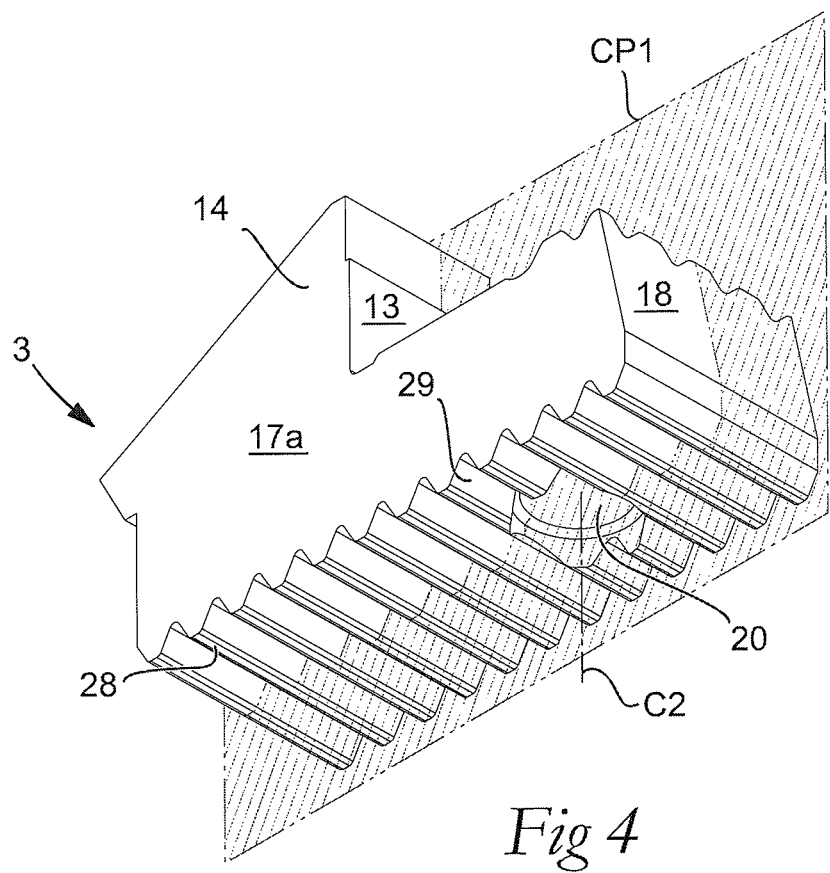
FIG. 4 is a bottom perspective view of the same cassette.

In the upperside of the cassette, a seating (a.k.a. an insert seat), in its entirety designated 11, is formed, which is delimited by a bottom surface or base surface 12, as well as a rear support protruding in relation to the same, which in this case is in the form of a plane surface 13 included in a lug 14, also in which the wedge surface 8 is included. The underside of the cassette is entirely occupied by the serration surface 10, the ridges and grooves of which are designated 15 and 16, respectively. Furthermore, the cassette is delimited by two plane and mutually parallel side surfaces 17a, 17b, which extend between front and rear end surfaces 18, 19. In FIG. 4, CP1 designates a vertical central plane, which is situated halfway between the side surfaces 17a, 17b. In the base surface 12, a hole 20 mouths having a female thread in which the male thread of a tightening screw 21 (see FIG. 7) can be tightened. In the example, the hole 20 is through and therefore also mouths in the underside of the cassette.

Reference is now made to FIGS. 9-12, which in detail show the nature of the cutting insert 2. Generally, the cutting insert includes an upperside 22, an underside 23 and a circumferential clearance surface generally designated 24, which in this case, when the cutting insert has a quadrangular basic shape, includes four part surfaces, viz. a front end surface 24a, a rear end surface 24b as well as two side surfaces 24c. Of these surfaces, the two side surfaces 24c are similar and situated at equal distances from a common central plane CP2. In the example, the cutting insert 2 includes only one cutting edge 25, formed between the upperside 22 of the cutting insert and the front part surface 24a, which is included in the clearance surface 24. The cutting edge 25 is in this case straight along the major part of its length, but transforms into arched part edges 25a at both ends thereof. From the cutting edge 25, the clearance surface 24 clears from or diverges in the downward direction as well as in the backward direction in the traditional way.

In the underside 23 of the cutting insert, a series of ridges and grooves 26, 27 are formed for co-operation with a series of ridges and grooves in the base surface 12 of the cassette 3. In order to conceptually separate these ridges and grooves from those ridges and grooves, which are included in the serration surfaces 9, 10 of the interface between the cassette and the disc body, the surface, which is occupied by the ridges/grooves 26, 27 and the corresponding arrangement in the base surface 12, is henceforth denominated "coupling section." The ridges and grooves included in the coupling section of the cassette (generally designated 32) are designated 28, 29 (see FIGS. 3 and 5). With continued reference to FIGS. 9-12, it should be pointed out that the cutting insert 2 includes a through, vertical hole 30, the center axis of which is designated C3. The upper mouth of the hole is delimited by a conical surface 31.

Figure 7:
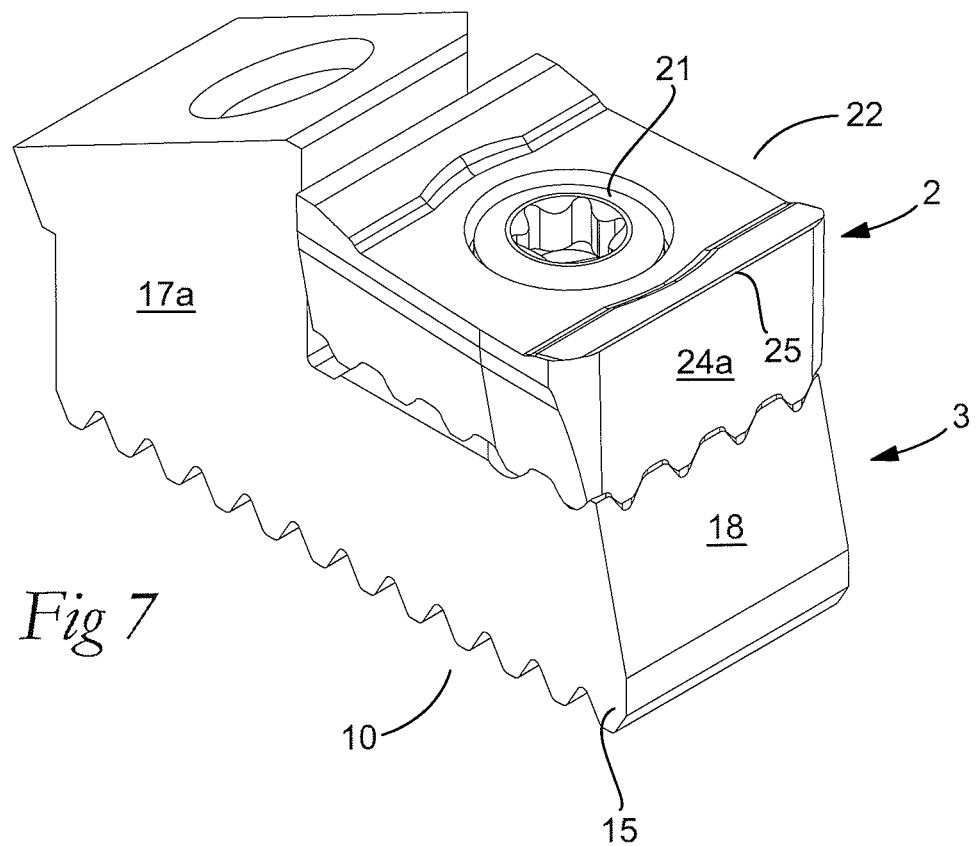
FIG. 7 is a perspective view showing a cutting insert according to the embodiment mounted in the cassette.
Figure 8:
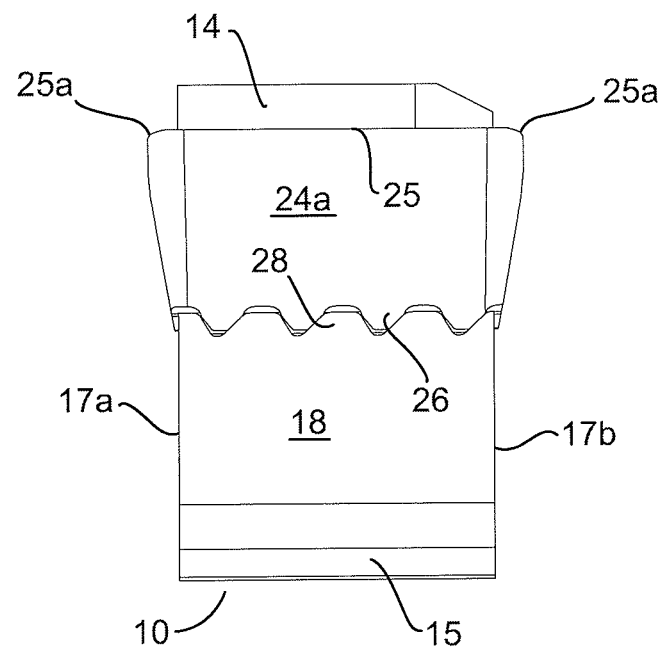
FIG. 8 is an end view from the front of the cassette and the cutting insert according to FIG. 7.
Figure 9:
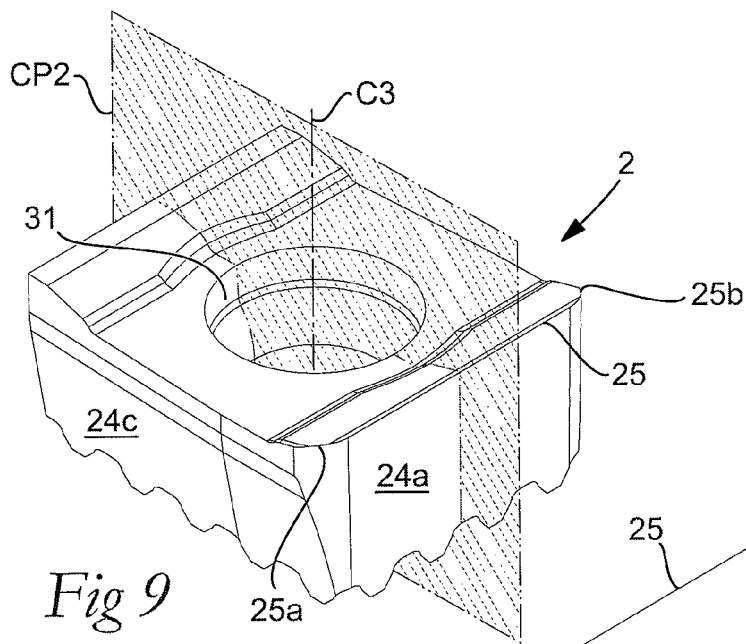
FIG. 9 is a top perspective view of the cutting insert according to the embodiment.
Figure 10:
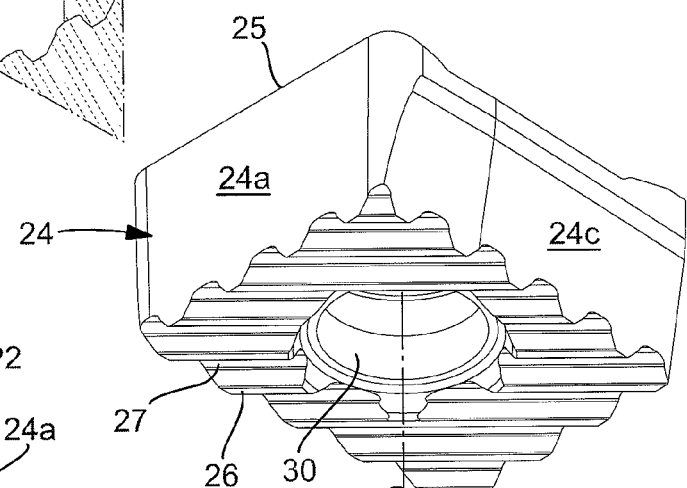
FIG. 10 is a bottom perspective view of the same cutting insert.
Figure 11:
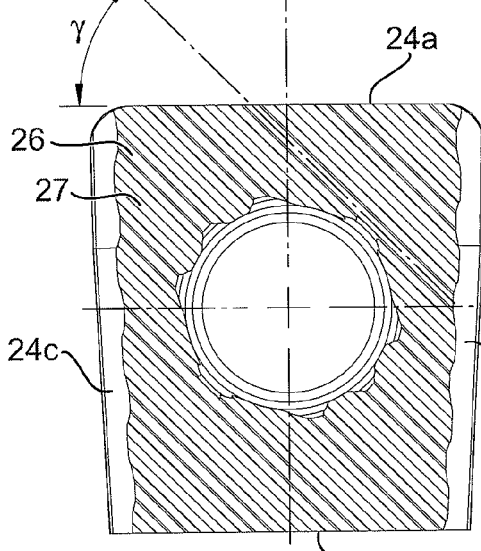
FIG. 11 is a planar view of the cutting insert according to FIGS. 9 and 10.
Figure 12:
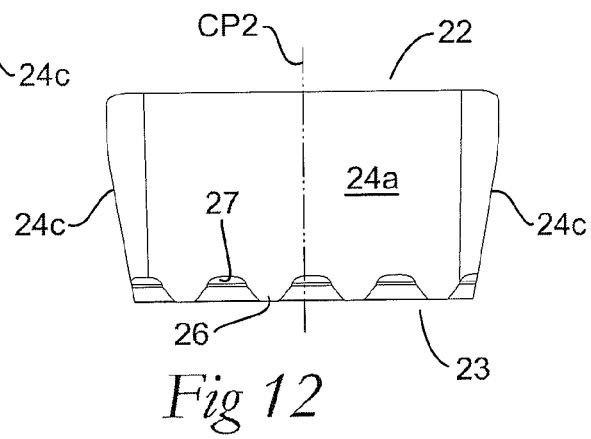
FIG. 12 is an end view from the front of the cutting insert.

In FIGS. 7 and 8, the cutting insert 2 is shown mounted in the cassette 3, more precisely by the tightening screw 21. In this state, the ridges 26 of the underside of the cutting insert are in engagement with the grooves 29 of the cassette and the ridges 28 in engagement with the grooves 27.

Before the invention is described in more detail, it should, for the sake of completeness, be pointed out that the greatest forces, which in this case act on the cutting insert during milling, are directed radially into the plane of the disc body. These radial forces are carried by the rear support surface formed in the cassette against which the rear end surface of the cutting insert is urged. However, the cutting insert is also exposed to more moderate lateral forces, which aim at displacing and rotating (at times alternately) the cutting insert in relation to the seating. It is naturally the task of the co-operating ridges to prevent such displacement and rotation.

As previously described, a disadvantage of known tools is that the ridges of the coupling section of the cassette extend parallel to the side surfaces of the cassette (and thereby perpendicularly to the rear support surface), at the same time as the ridges of the underside of the cutting insert run perpendicularly to the cutting edge or essentially parallel to the side surfaces of the cutting insert. Therefore, when the cutting insert—and thereby also the seating of the cassette—is small, difficulties arise to give the ridges of the coupling section of the cassette a sufficient length in order to ensure a stable fixation of the cutting insert. Thus, the shank-end mill, which is usually used for milling the grooves of the coupling section of the cassette, cannot be brought closer to the rear support surface than the distance that corresponds to half the diameter of the shank-end mill.

Figure 5:
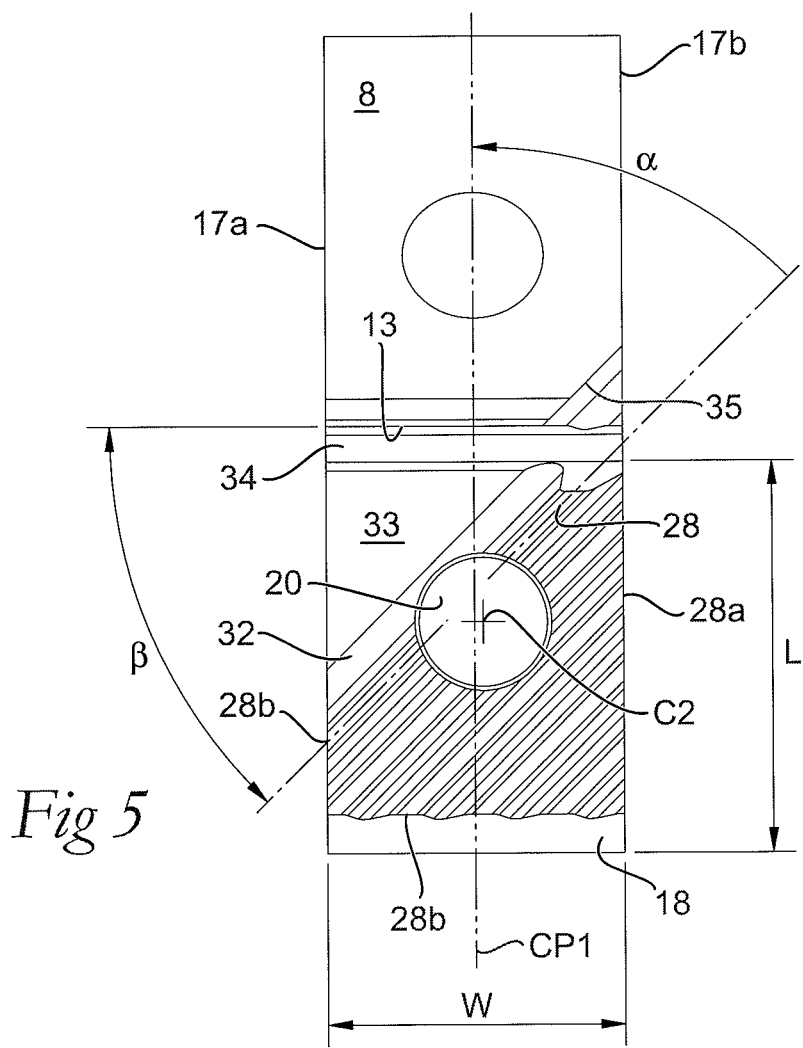
FIG. 5 is a planar view from above of the cassette.

According to the invention, the above-mentioned problems are solved by the fact that the ridges (and the grooves) of the two coupling sections of the cassette and the cutting insert, respectively, are angled or inclined in relation to the central planes CP1 and CP2 thereof. In FIGS. 3 and 5, 32 designates the coupling section, which is formed by the ridges 28 and the grooves 29, i.e., the part of the base surface 12 of the seating 11, which can be coupled together mechanically with the ridges 26 and the grooves 27 of the underside of the cutting insert. As seen in FIG. 5, the ridges 28 of the coupling section 32 form an acute angle $\alpha$ with the central plane CP1. Also with the support surface 13, the ridges 28 form an acute angle $\beta$. Because the support surface 13, in this case, extends perpendicularly to the central plane CP1, the angle $\beta$ forms a complementary angle to the angle $\alpha$. By the fact that the ridges 28 are inclined, instead of running parallel to the center plane CP1, imaginary extensions of the ridges extend by the side of the support surface. In such a way, the ridges can be provided by a shank-end mill, which can freely pass beside the support surface 13, i.e., without damaging the same, the projection surface of the coupling section 32 and the length of the ridges becoming greater than if the ridges were parallel to the center plane and thereby would need to end at a comparatively great distance from the support surface 13.

Since the two side surfaces 17a, 17b of the cassette as well as the end surface 18, in this case, are plane, the borderlines, which determine the contour shape of the base surface 12, will become straight. As is clearly seen by the planar view in FIG. 5, the ridges 28 extend up to the borderlines, i.e., the opposite ends of the ridges are located along the borderlines. A first end of each ridge is designated 28a, while the opposite end is designated 28b. As is clearly seen in FIG. 5, all first ends 28a are located along one of the side surfaces 17b, while certain opposite, second ends 28b are located along the front end surface 18 of the cassette, while the other second ends 28b are situated along the opposite end surface 17a of the cassette.

Between the coupling section 32 and the support surface 13, there is a free surface 33, which, in this case, has a triangular shape and tapers toward the end of an adjacent ridge, which is situated closest to the support surface.

Between the base surface 12 and the support surface 13 a chute-shaped countersink 34 is formed, which forms a clearance space for the rear part of the underside of the cutting insert. Therefore, the length L of the base surface is determined by the distance between the countersink 34 and the front end surface 18 of the cassette. The width of the cassette is designated W. In the example shown, the angle $\alpha$ as well as the angle $\beta$ amount to 45°, the coupling section 32 formed by the ridges and the grooves occupying approx. 74% of the total area of the base surface 12.

In order to optimize the area of the coupling section 32, the lug 14 has been formed with a chamfer surface 35, which, like the ridges, extends at 45° angle to the central plane CP1. In this way, the width of the support surface 13 in relation to the total width W of the cassette is reduced, but it is still sufficiently great to reliably carry the radial forces, which act on the cutting insert. In the example, the width of the support surface 13 amounts to approx. 75% of the width of the cassette W. Of course, this width may vary upward as well as downward. In any event, it should however amount to at least 50%.

Furthermore, the angle $\alpha$ as well as the angle $\beta$ may vary, even independently of each other, namely if the support surface 13 is located at an angle other than 90° to the central plane CP1. Generally, it applies that the area of the coupling section 32 (on condition that the shape and size of the base surface 12 is the same and that the support surface 13 has one and the same width) decreases by a decreasing angle $\alpha$, and vice versa. In order to ensure, in practice, a sufficient area of the coupling section as well as a sufficient width of the support surface 13, the angle $\alpha$ should however not be less than 25°. On the other hand, $\alpha$ should not be greater than 50°, because otherwise the ability of the ridges to carry lateral forces from the cutting insert is reduced to too great an extent.

In practice, the area of the coupling section 32 should amount to at least ⅔ of the total area of the base surface 12.

Figure 6:
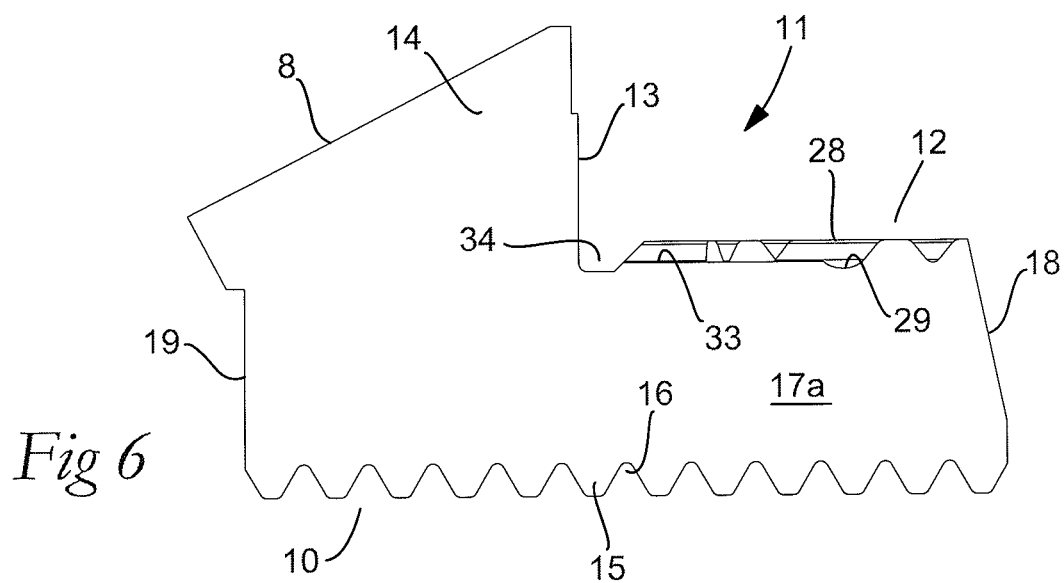
FIG. 6 is a side view of the cassette.

As is seen in FIG. 6, the free surface 33 is, on one hand, situated on a level under the highest level of the coupling section 32, as represented by the crests of the ridges 28, and, on the other hand, on a level above the lowest level of the coupling section, as represented by the bottoms of the grooves 29. The bottom of the countersink 34 is situated on a level under the free surface 33.

In the exemplified embodiment of the tool, the cutting insert (see again FIGS. 9-12) is symmetrical in relation to the central plane CP2, and has only one chip removing cutting edge 25. In this connection, the ridges 26 of the second coupling section, which is formed on the underside 23 of the cutting insert, extend at an acute angle 6 to the central plane CP2. In order to locate the cutting insert symmetrically in relation to the central plane of the cassette 3, δ and α should be equally large, i.e., 45° in the example. Because the cutting edge 25 extends perpendicularly to the central plane CP2, γ forms a complementary angle to δ. If δ is 45° also γ will accordingly be 45°. It should also be noted that the coupling section of the underside of the cutting insert extends along the entire underside by the fact that all grooves 27 open in the different part surfaces of the clearance surface 24. Also the ridges 26 should extend at least 25° and at most 50° angle to the central plane.

In FIG. 5, it is seen that the hole 20 for the tightening screw 21 is displaced somewhat sidewards in relation to the central plane CP1. The corresponding hole 30 of the cutting insert is, however, centrally situated, so far that the center axis C3 thereof coincides with the central plane CP2 of the cutting insert. The screw 21, which has a conical head (not visible), is formed of steel having a certain inherent elasticity. Due to the eccentricity between the holes 20 and 30, the screw 21 will, when it is tightened, apply not only a downwardly directed force, but also a spring force to the cutting insert, which displaces the same diagonally towards the right and rearward in FIG. 5, until the rear end surface 24b of the cutting insert is pressed in close contact against the rear support surface 13. In this position, also a small cutting insert is anchored in a stable way so far that displacement thereof in the direction radially into the disc body is prevented by the support surface 13 of the lug 14, at the same time as rotation of the cutting insert as a consequence of lateral forces is efficiently counteracted by the ridge or ridges 28 included in the coupling section 32, which are situated closest to the support surface, because these are long and also engage the rear part of the underside of the cutting insert.

A fundamental advantage of the invention is that the L-shaped (as viewed from the side) seating, which has the purpose of stably anchoring replaceable cutting inserts, in particular small cutting inserts, can by conventional, simple milling (or equivalent machining) be given a proportionally great surface at the same time as the longest ridge or ridges thereof extend up to the immediate vicinity of the protruding support. In such a way, it is ensured that parts of the ridges also engage the rear part of the corresponding coupling section of the cutting insert so that rotation of the cutting insert is efficiently counteracted. In other words, the front end of the coupling section of the base surface, where the greatest forces from the cutting insert are carried, is still formed with ridges along the entire width of the base surface, at the same time as the longest ridge or ridges extend all the way up to the rear end of the base surface.

In the embodiment of the tool exemplified in the drawings, the cutting insert has a symmetrical basic shape and includes only one, front cutting edge. Within the scope of the invention, it is also possible to use indexable cutting inserts having two or more cutting edges, provided that the acute angle at which the ridges of the coupling sections are inclined amounts to exactly 45°. Furthermore, it should be pointed out that the described inclination of the ridges can be utilized in a particularly advantageous way, if dominant cutting forces are applied to the cutting insert in the direction diagonally toward an individual corner of the cutting insert. By locating the ridges at a suitable angle to the dominant line of force action, e.g., 90° or near 90°, the ridges can be utilized in order to carry, together with the rear support, great cutting forces, in addition to efficiently counteracting rotation of the cutting insert. It should also be pointed out that the rear support does not necessarily have to be a plane surface, such as in the example. It is merely important that a rear support sticks up in relation to the base surface of the seating and has at least line or point contact with the rear end surface of the cutting insert in order to prevent displacement of the cutting insert in the backward direction. Instead of a lug having the same width as the base surface, a protruding upright, e.g., a stud, having a smaller width or diameter, could accordingly be used. Also the geometrical design of the ridges and the grooves included in the coupling sections may be modified in various ways. Thus, instead of genuinely straight ridges, slightly curved ridges may be considered. Even if the ridges generally are cross-sectionally wedge-shaped, the flank angles (which normally amount to 60°) may be varied within fairly wide limits. If the cutting insert is merely subjected to moderate lateral forces, which aim to rotate the same, it is also possible to form the individual coupling sections with only one or a few ridges and grooves instead of as many as five according to the example. Furthermore, the cutting insert may have a round, instead of the polygonal, basic shape. Such as has been indicated by way of introduction, the invention is also applicable to other cutting tools than milling cutters, e.g., tools for turning as well as drilling. Particular advantages are foreseen in an application to exactly turning tools, because the turning inserts for these are often exposed to cutting forces, which act diagonally toward a corner of the insert. It is furthermore possible to form the rear support surface of the seating in a particular, replaceable shim, which is pressed against the rear lug (or a corresponding part directly in the basic body) of the cassette. In such a way, use of different, wedge-shaped shims having varying wedge angles is enabled, whereby the angle of the support surface in relation to the ridges of the coupling section may be varied. It is also possible to supplement the free surface with a number of short ridges/grooves, which end at such a great distance from the protruding support surface that this does not risk being damaged. In such a way, the area of the coupling section can be enlarged at the same time as one or more ridges retain full length in order to reliably counteract rotation of the rear part of the cutting insert. In conclusion, it should be mentioned that the seating or insert seat, which has the purpose of receiving the replaceable cutting insert, of course does not need to be formed in a cassette or another part, e.g., a shim plate, which is semi-permanently connected with the rest of the basic body. Thus, the seating may also be formed directly in a solid basic body.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A tool for chip removing machining, comprising:
   a basic body, in which at least one seating is included, which is delimited by a base surface and a rear support protruding in relation to the base surface, the base surface including a first coupling section in the form of one or more ridges and grooves; and
   a replaceable cutting insert having an upperside, an underside and a clearance surface extending between the upperside and the underside and transforming into the upperside via at least one cutting edge, the underside including a second coupling section having one or more grooves and ridges which engage the grooves of the first coupling section, and vice versa, at the same time as a part of the clearance surface is urged against the rear support,
   wherein the rear support is formed at an acute angle ($\beta$) in relation to the ridges of the first coupling section, and an imaginary extension of the ridges of the first coupling section intersects with an imaginary extension of the rear support.

2. The tool according to claim 1, wherein the first coupling section includes a plurality of ridges spaced-apart by grooves, the opposite ends of which are located along borderlines, which determine the contour shape of the base surface.

3. A tool for chip removing machining, comprising:
   a basic body, in which at least one seating is included, which is delimited by a base surface and a rear support protruding in relation to the base surface, the base surface including a first coupling section in the form of one or more ridges and grooves; and
   a replaceable cutting insert having an upperside, an underside and a clearance surface extending between the upperside and the underside and transforming into the upperside via at least one cutting edge, the underside including a second coupling section having one or more grooves and ridges which engage the grooves of the first coupling section, and vice versa, at the same time as a part of the clearance surface is urged against the rear support,
   wherein an imaginary extension of the ridges of the first coupling section extends by the side of the rear support, and
   wherein the base surface includes a free surface in addition to the coupling section, the free surface tapers toward the end of an adjacent ridge that is situated closest to the rear support, at the same time as the coupling section tapers toward the rear support.

4. The tool according to claim 3, wherein the free surface is situated on a level under the highest level of the first coupling section, as represented by the crest of one or more ridges, and on a level above the lowest level of the first coupling section, as represented by the bottom of one or more grooves.

5. The tool according to claim 2, wherein the width of the rear support amounts to at least half the width of the base surface, as represented by the distance between two side borderlines.

6. The tool according to claim 1, wherein a chute-shaped countersink is formed between the base surface and the rear support.

7. The tool according to claim 1, wherein the first coupling section has a projection area which occupies at least 2/3 of the total projection area of the base surface.

8. The tool according to claim 1, wherein the acute angle ($\beta$) between the rear support and the ridges amounts to at least 25°.

9. The tool according to claim 1, wherein the acute angle ($\beta$) between the rear support and the ridges amounts to at most 50°.

10. The tool according to claim 1, wherein the acute angle ($\beta$) between the rear support and the ridges amounts to 45°.

11. The tool according to claim 1, wherein the seating of the basic body is formed in a separate element, which is included in the basic body by being semi-permanently connected to the basic body.

12. The tool according to claim 11 in the form of a side and face milling cutter, the basic body of which is a circular disc rotatable around a center axis, the periphery of which includes a plurality of cutting inserts, each one of which is mounted in an element in the form of a cassette, which is semi-permanently connected with the disc via an interface including a first serration surface in the form of a series of ridges and grooves formed in the disc, and a second serration surface formed in an underside of the cassette in the form of grooves and ridges, which run parallel to the center axis of the disc and which engage the grooves of the first serration surface and vice versa, the first coupling section being formed in the upperside of the cassette between a rear lug and a front end surface, besides which the cassette is delimited by a pair of spaced-apart side surfaces, which extend from the front end surface toward a rear end surface, wherein the ridges of the first coupling section are formed at an acute angle ($\alpha$) to the side surfaces such that an imaginary extension of the ridges of the first coupling section extend by the side of the lug.

13. The tool according to claim 12, wherein all first ends of pairs of opposite first and second ends of the ridges of the first coupling section are situated along one of the side surfaces, while at least certain opposite second ends are situated along the entire width of the front end surface of the cassette.

14. The tool according to claim 12, wherein the angle ($\alpha$) between the side surfaces and the ridges amounts to at least 25°.

15. The tool according to claim 12, wherein the angle ($\alpha$) between the side surfaces and the ridges amounts to at most 50°.

16. The tool according to claim 12, wherein the angle ($\alpha$) between the side surfaces and the ridges amounts to 45°.

17. A basic body of a tool for chip removing machining, comprising:
   a seating that receives cutting inserts, which is delimited by a base surface and a rear support protruding in relation to the base surface, the base surface including a coupling section in the form of one or more ridges and grooves,
   wherein the rear support is formed at an acute angle ($\beta$) in relation to the ridges of the coupling section, and an imaginary extension of the ridges of the coupling section intersects with an imaginary extension of the rear support.

18. The basic body according to claim 17, wherein the coupling section includes a plurality of ridges spaced-apart by grooves, the opposite ends of which are located along borderlines, which determine the contour shape of the base surface.

19. A basic body of a tool for chip removing machining, comprising:
   a seating that receives cutting inserts, which is delimited by a base surface and a rear support protruding in relation to the base surface, the base surface including a coupling section in the form of one or more ridges and grooves,
   wherein an imaginary extension of the ridges of the coupling section extends by the side of the rear support, and wherein the base surface includes a free surface in addition to the coupling section, the free surface tapers toward the end of an adjacent ridge that is situated closest to the rear support.

20. The basic body according to claim 19, wherein the free surface is situated on a level under the highest level of the coupling section, as represented by the crest of one or more ridges, and on a level above the lowest level of the coupling section, as represented by the bottom of one or more grooves.

21. The basic body according to claim 17, wherein the width of the rear support amounts to at least half the width of the base surface, as represented by the distance between two spaced-apart side borderlines of the base surface.

22. The basic body according to claim 17, wherein a chute-shaped countersink is formed between the base surface and the rear support.

23. The basic body according to claim 17, wherein the coupling section has a projection area, which occupies at least ⅔ of the total projection area of the base surface.

24. The basic body according to claim 17, wherein the angle ($\beta$) between the rear support and the ridges amounts to at least 25°.

25. The basic body according to claim 17, wherein the angle ($\beta$) between the rear support and the ridges amounts to at most 50°.

26. The basic body according to claim 17, wherein the angle ($\beta$) between the rear support and the ridges amounts to 45°.

27. The basic body according to claim 17, wherein the seating is formed in a separate element, which is included in the basic body by being semi-permanently connected with the basic body.

28. The basic body according to claim 27 in the form of a circular disc rotatable around a center axis, the periphery of which includes a cassette, which is semi-permanently connected with the disc via an interface including a first serration surface in the form of a series of ridges and grooves formed in the disc, and a second serration surface in the form of a series grooves and ridges formed in an underside of the cassette, which run parallel to the center axis of the disc, and which engage the grooves of the first serration surface, and vice versa, the coupling section being formed in the upperside of the cassette between a rear lug and a front end surface, besides which the cassette is delimited by a pair of spaced-apart side surfaces, which extend from the front end surface toward a rear end surface, wherein the ridges of the coupling section are formed at an acute angle ($\alpha$) to the side surfaces such that an imaginary extension of the ridges of the coupling section extend by the side of the lug.

29. The basic body according to claim 28, wherein the angle ($\alpha$) amounts to at least 25°.

30. The basic body according to claim 28, wherein the angle ($\alpha$) amounts to at most 50°.

31. The basic body according to claim 28, wherein the angle ($\alpha$) amounts to 45°.

32. The basic body according to claim 28, wherein all first ends of pairs of opposite first and second ends of the ridges of the coupling section are situated along one of the side surfaces, while at least certain opposite second ends are situated along the entire width of the front end surface of the cassette.

33. A replaceable cutting insert for a tool, the tool comprising a basic body, in which at least one seating is included, which is delimited by a base surface and a rear support protruding in relation to the base surface, the base surface including a first coupling section in the form of one or more ridges and grooves, wherein an imaginary extension of the ridges of the first coupling section intersects with an imaginary extension of the rear support, the cutting insert comprising:
   an upperside, an underside, and a clearance surface extending between the upperside and underside and transforming into the upperside via at least one cutting edge, the underside including a second coupling section in the form of a plurality of ridges which are spaced-apart by grooves, each ridge having a pair of opposite ends, wherein the ridges run at an acute angle ($\gamma$) in relation to the cutting edge.

34. The cutting insert according to claim 33, wherein the second coupling section extends along the entire underside such that all grooves between the ridges open in the clearance surface.

35. The cutting insert according to claim 33, wherein the angle ($\gamma$) between the ridges and the cutting edge amounts to at least 25°.

36. The cutting insert according to claim 33, wherein the angle ($\gamma$) between the ridges and the cutting edge amounts to at most 50°.

37. The cutting insert according to claim 33, wherein the angle ($\gamma$) between the ridges and the cutting edge amounts to 45°.

* * * * *